(12) United States Patent
Jagtap et al.

(10) Patent No.: US 11,577,796 B2
(45) Date of Patent: Feb. 14, 2023

(54) AUTO TRACK ALIGNMENT AND UNDERCARRIAGE SWING

(71) Applicant: Deere & Company, Moline, IL (US)

(72) Inventors: Dnyaneshwar J. Jagtap, Dhule (IN); Dipankar D. Dongare, Pune (IN); Rushikesh R. Jadhav, Parbhani (IN); Lance R. Sherlock, Asbury, IA (US); David A. Veasy, Dubuque, IA (US)

(73) Assignee: Deere & Company, Moline, IL (US)

( * ) Notice: Subject to any disclaimer, the term of this patent is extended or adjusted under 35 U.S.C. 154(b) by 887 days.

(21) Appl. No.: 16/508,948

(22) Filed: Jul. 11, 2019

(65) Prior Publication Data

US 2021/0009215 A1  Jan. 14, 2021

(51) Int. Cl.
| | | |
|---|---|---|
| *B62D 55/00* | (2006.01) | |
| *E02F 9/12* | (2006.01) | |
| *E02F 9/20* | (2006.01) | |
| *B62D 55/116* | (2006.01) | |

(52) U.S. Cl.
CPC ............ *B62D 55/116* (2013.01); *E02F 9/123* (2013.01); *E02F 9/20* (2013.01)

(58) Field of Classification Search
CPC .......... B62D 55/116; E02F 9/123; E02F 9/20; E02F 3/36; E02F 9/085; E02F 9/2025
See application file for complete search history.

(56) References Cited

U.S. PATENT DOCUMENTS

| | | | |
|---|---|---|---|
| 3,184,867 A | 5/1965 | Symmank | |
| 4,111,066 A | 9/1978 | Kendrick | |
| 4,552,503 A | 11/1985 | Mouri et al. | |
| 6,477,914 B1 | 11/2002 | Krieger | |
| 7,055,269 B2 * | 6/2006 | Lovato | E02F 9/2257 180/41 |
| 7,772,792 B2 * | 8/2010 | Kawaguchi | H02P 23/20 318/432 |
| 8,180,532 B2 | 5/2012 | O'Halloran et al. | |
| 8,694,204 B2 * | 4/2014 | Reeb | E02F 9/123 701/50 |
| 10,494,788 B2 * | 12/2019 | Glasser | E02F 9/121 |
| 2012/0065840 A1 * | 3/2012 | Reeb | B66C 23/94 701/36 |
| 2014/0257647 A1 * | 9/2014 | Wu | E02F 9/24 701/50 |

FOREIGN PATENT DOCUMENTS

| | | |
|---|---|---|
| GB | 2134876 A | 8/1984 |
| WO | 2008129345 A1 | 10/2008 |

OTHER PUBLICATIONS

European Search Report issued in counterpart application No. 20179491.4 dated Nov. 26, 2020 (08 pages).

* cited by examiner

*Primary Examiner* — Tyler J Lee
(74) *Attorney, Agent, or Firm* — Lucian Wayne Beavers; Patterson Intellectual Property Law, PC

(57) ABSTRACT

A working machine includes an undercarriage, a main frame, a swing bearing supporting the undercarriage from the main frame, a swing motor configured to pivot the main frame on the swing bearing about a pivot axis, a boom extending from the main frame along a working direction, and a pivot angle sensor configured to provide a pivot angle signal corresponding to a pivot position of the main frame relative to the undercarriage about the pivot axis. A controller is configured to receive the pivot angle signal and to drive the swing motor automatically.

20 Claims, 7 Drawing Sheets

AUTO TRACK ALIGNMENT AND UNDERCARRIAGE SWING

FIELD OF THE DISCLOSURE

The present disclosure relates to working machines of the type having a boom assembly pivotal about a generally vertical pivot axis relative to an undercarriage of the working machine.

BACKGROUND

Working machines of this type may for example include excavator machines, feller buncher machines, front shovel machines, and others. These machines may have tracked or wheeled ground engaging units supporting the undercarriage from the ground surface. Various situations arise with such machines where the human operator needs to control the pivotal position of the boom assembly relative to the undercarriage.

For example in the case of a tracked excavator machine, undercarriage orientation relative to the boom assembly affects machine stability and it affects the wear on the tracks during the excavating operation. Often the human operator needs to change the undercarriage orientation without disturbing the boom assembly orientation relative to the ground surface. The human operator may desire to align the boom assembly with the tracks so that the digging direction extends in a forward advance direction of the tracks to improve stability and to reduce wear on the tracks. Or the human operator may need to reorient the undercarriage relative to some feature of the ground surface without affecting the orientation of the boom assembly relative to the ground surface.

Currently to change alignment of the boom assembly with the undercarriage without changing the orientation of the undercarriage relative to the ground surface requires the human operator to move the excavator or other working machine back and forth multiple times, which contributes to operator strain and fatigue. To perform such a change in alignment without changing the boom assembly orientation relative to the ground surface the human operator must be highly skilled as simultaneous control operations are required.

SUMMARY OF THE DISCLOSURE

The current disclosure provides improvements in automatic control systems for controlling alignment of the boom assembly and the undercarriage.

In one embodiment a working machine comprises an undercarriage including first and second ground engaging units including first and second travel motors for driving the first and second ground engaging units, respectively. A main frame is supported from the undercarriage by a swing bearing such that the main frame is pivotable about a pivot axis relative to the undercarriage, the pivot axis being substantially vertical when a ground surface engaged by the ground engaging units is substantially horizontal. A swing motor is configured to pivot the main frame on the swing bearing about the pivot axis relative to the undercarriage. A boom extends from the main frame along a working direction of the boom. A pivot angle sensor is configured to provide a pivot angle signal corresponding to a pivot position of the main frame relative to the undercarriage about the pivot axis. A controller is configured to receive the pivot angle signal and to selectively drive the swing motor automatically to rotate the main frame about the pivot axis relative to the undercarriage to a target pivot position of the main frame relative to the undercarriage.

In another embodiment a method is provided of controlling such a working machine. The method may include steps of:

(a) automatically sensing a pivot position of the main frame relative to the undercarriage about the pivot axis; and (b) automatically controlling the swing motor and thereby rotating the main frame about the pivot axis relative to the undercarriage to a target pivot position of the main frame relative to the undercarriage.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
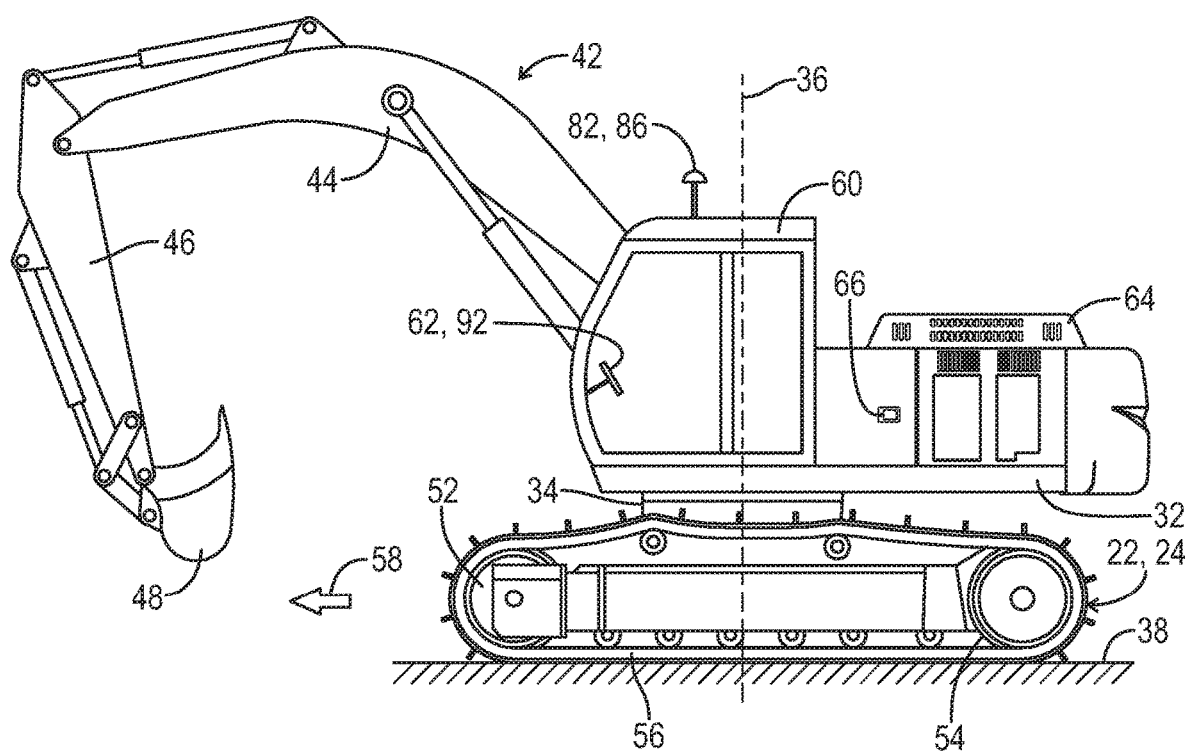
FIG. 1 is a side elevation view of a tracked excavator machine incorporating the automatic control systems disclosed herein.

Referring now to the drawings and particularly to FIG. 1, a working machine is shown and generally designated by the number 20. FIG. 1 shows a tracked excavator machine 20. The systems disclosed herein are applicable to excavator machines, feller buncher machines, front shovel machines, and other working machines of the type having a boom assembly pivotal about a generally vertical pivot axis relative to an undercarriage of the working machine. These machines may have tracked or wheeled ground engaging units supporting the undercarriage from the ground surface.

Figure 2:
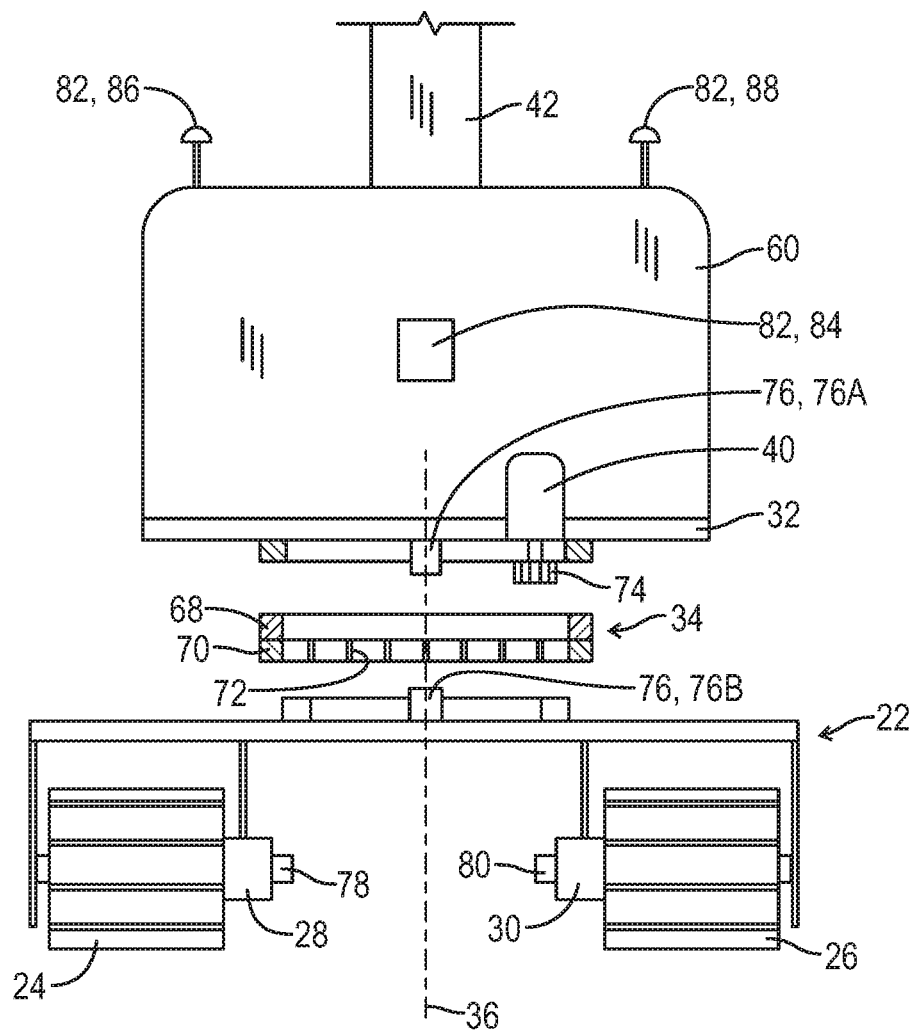
FIG. 2 is a schematic rear elevation exploded view of the tracked excavator machine of FIG. 1 illustrating the undercarriage separated from the swing bearing and the main frame. The swing motor for pivoting the main frame relative to the undercarriage, and the travel motors for driving the tracks are schematically illustrated. Also schematically illustrated are a pivot angle sensor, first and second travel motor speed sensors, and two alternative designs for an orientation sensor.

The working machine 20 is shown in side elevation assembled view in FIG. 1, and in rear elevation schematic partially exploded view in FIG. 2.

The working machine 20 includes an undercarriage 22 including first and second ground engaging units 24 and 26 including first and second travel motors 28 and 30 for driving the first and second ground engaging units 24 and 26, respectively.

A main frame 32 is supported from the undercarriage 22 by a swing bearing 34 such that the main frame 32 is pivotable about a pivot axis 36 relative to the undercarriage. The pivot axis 36 is substantially vertical when a ground surface 38 engaged by the ground engaging units 24 and 26 is substantially horizontal. A swing motor 40 is configured to pivot the main frame 32 on the swing bearing 34 about the pivot axis 36 relative to the undercarriage 22.

A boom assembly 42 includes a boom 44, an arm 46 pivotally connected to the boom 44, and a working tool 48. The boom 44 is pivotally attached to the main frame 32 to pivot about a generally horizontal axis relative to the main frame 32. The working tool in this embodiment is an excavator shovel 48 which is pivotally connected to the arm 46. The boom assembly 42 extends from the main frame 32 along a working direction 50 of the boom assembly 42. The working direction 50 can also be described as a working direction of the boom 44.

In the embodiment of FIG. 1 the first and second ground engaging units 24 and 26 are tracked ground engaging units. Each of the tracked ground engaging units includes a front idler 52, a drive sprocket 54, and a track chain 56 extending around the front idler 52 and the drive sprocket 54. The travel motor 28 or 30 of each tracked ground engaging unit 24 or 26 drives its respective drive sprocket 54. Each tracked ground engaging unit has a forward traveling direction 58 defined from the drive sprocket 54 toward the front idler 52. The forward traveling direction 58 of the tracked ground engaging units also defines a forward traveling direction 58 of the undercarriage 22 and thus of the working machine 20.

An operator's cab 60 may be located on the main frame 32. The operator's cab 60 and the boom assembly 42 may both be mounted on the main frame so that the operator's cab 60 faces in the working direction 50 of the boom assembly. A control station 62 may be located in the operator's cab 60.

Also mounted on the main frame 32 is an engine 64 for powering the working machine 20. The engine 64 may be a diesel internal combustion engine. The engine 64 may drive a hydraulic pump 66 to provide hydraulic power to the various operating systems of the working machine 20. The engine 64, the hydraulic pump 66 and the related hydraulic power system for the working machine 20 are further illustrated schematically in FIG. 4 which is further described below.

The swing bearing 34 as schematically shown in FIG. 2 includes an upper ring 68 configured to be bolted to the underside of the main frame 32, and a lower ring 70 configured to be bolted to the undercarriage 22. The lower ring 70 includes an internally toothed ring gear 72. The swing motor 40 is mounted on the main frame 32 and drives a pinion gear 74 which extends downward into engagement with the internally toothed ring gear 72. Operation of the swing motor 40 drives the pinioin gear 74 which results in pivoting movement of the main frame 32 on the swing bearing 34 about the pivot axis 36 relative to the undercarriage 22.

As schematically illustrated in FIG. 2, a pivot angle sensor 76 may include an upper sensor part 76A mounted on the main frame 32 and a lower sensor part 76B mounted on the undercarriage 22. The pivot angle sensor 76 is configured to provide a pivot angle signal 76S (see FIG. 4) corresponding to a pivot position of the main frame 32 relative to the undercarriage 22 about the pivot axis 36. The pivot angle sensor 76 may for example be a Hall Effect rotational sensor. Such a Hall Effect rotational sensor may include a Hall element, a rotating shaft and a magnet. When the angular position of the Hall element changes, the corresponding changes in the magnetic field results in a linear change in output voltage. Other suitable types of rotary position sensors include rotary potentiometers, resolvers, optical encoders, inductive sensors and the like.

The first and second travel motors 28 and 30 may have associated therewith first and second travel motor speed sensors 78 and 80 configured to provide first and second travel motor speed signals 78S and 80S (see FIG. 4), respectively, corresponding to rotational speeds of the first and second travel motors 28 and 30. The travel motor speed sensors 78 and 80 may for example be Hall Effect rotational sensors, or any of the alternative sensor types noted above.

The working machine 20 may further include an orientation sensor 82 configured to provide an orientation signal 82S (see FIG. 4) corresponding to an orientation or a change in orientation of the orientation sensor 82 relative to the ground surface 38. Although the orientation sensors 82 are shown in FIG. 1 as being fixed relative to the main frame 32, they could also be mounted on the undercarriage 22.

One embodiment of the orientation sensor 82 may include an inertial measurement unit (IMU) 84 mounted on the main frame 32 or the cab 60. Such an IMU may be in the form of a three-axis gyroscopic unit configured to detect changes in orientation of the orientation sensor 82, and thus of the main frame 32 to which it is fixed, relative to an initial orientation.

Another embodiment of the orientation sensor 82 may include a plurality of GPS sensing units 86, 88 fixed relative to the main frame 32 and the cab 60. Such GPS sensing units can detect the absolute position and orientation of the working machine 20 within an external reference system, and can detect changes in such position and orientation.

Another embodiment of the orientation sensor 82 may include a camera based system which can observe surrounding structural features via image processing, and can respond to the orientation of the working machine relative to those surrounding structural features. Such a camera based orientation sensor 82 may also display to the human operator an image of the undercarriage and the surrounding ground surface 38.

Figure 4:
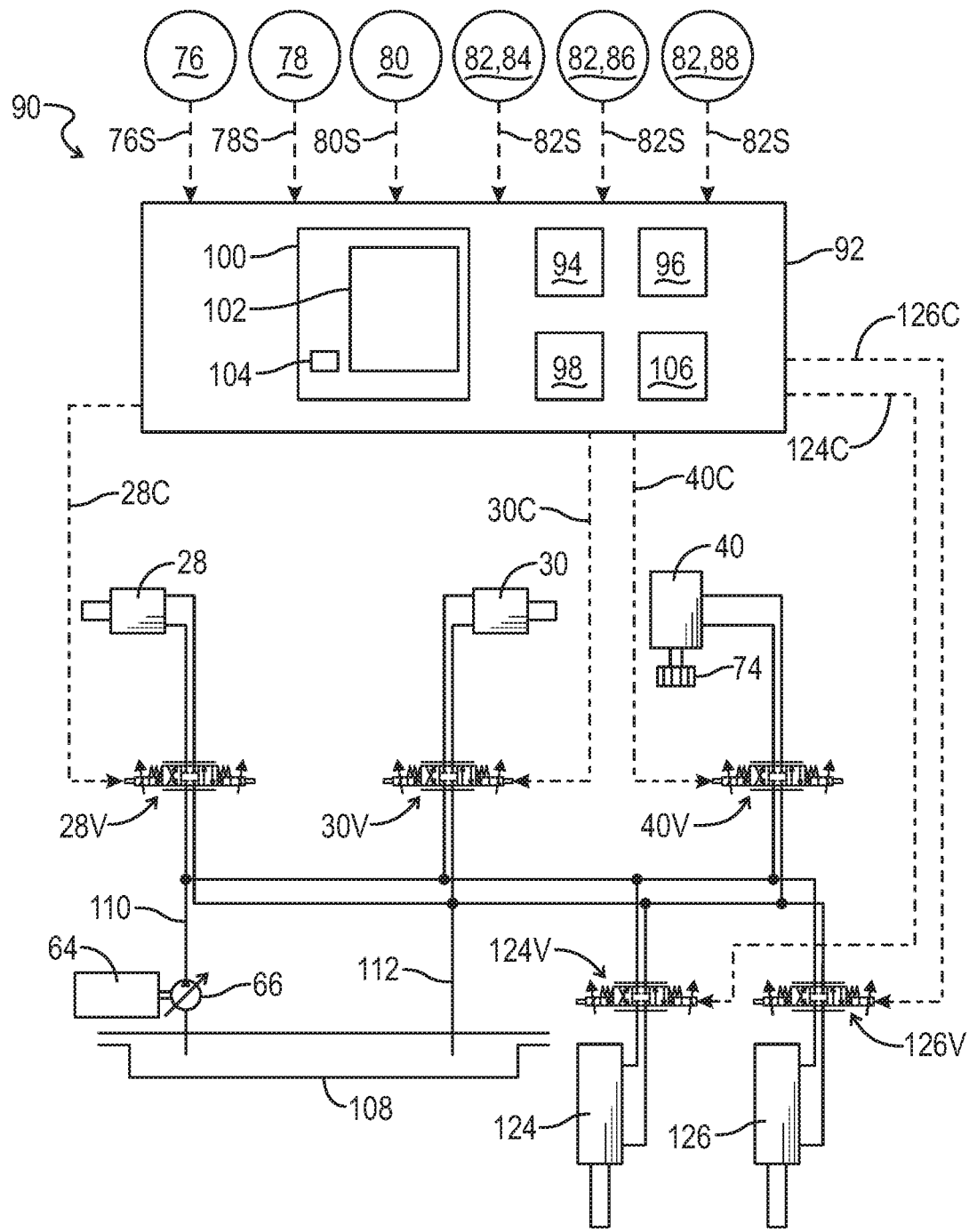
FIG. 4 is a schematic illustration of a controller with the associated input sensors and the output signals to the associated actuators.

The Control System of FIG. 4

As schematically illustrated in FIG. 4, the working machine 20 includes a control system 90 including a controller 92. The controller 92 may be part of the machine control system of the working machine 20, or it may be a separate control module. The controller 92 may be mounted in the operators cab 60 at the control panel 62. The controller 92 is configured to receive as input signals the pivot angle signal 76S from the pivot angle sensor 76, the motor speed signals 78S and 80S from the motor speed sensors 78 and 80, and the orientation signal 82S from the orientation sensor 82. The signals transmitted from the various sensors to the controller 92 are schematically indicated in FIG. 4 by phantom lines connecting the sensors to the controller with an arrowhead indicating the flow of the signal from the sensor to the controller 92.

Similarly, the controller 92 will generate control signals for controlling the operation of the various actuators, which control signals are indicated schematically in FIG. 4 by phantom lines connecting the controller 92 to the various actuators with the arrow indicating the flow of the command signal from the controller 92 to the respective actuator. It will be understood that the various actuators as disclosed herein may be hydraulic motors or may be hydraulic piston-cylinder units and that the electronic control signals from the controller 92 will actually be received by electro-hydraulic control valves associated with the actuators and the electro-hydraulic control valves will control the flow of hydraulic fluid to and from the respective hydraulic actuators to control the actuation thereof in response to the control signal from the controller 92.

Alternatively, the actuators may be electric actuators. The swing motor 40 and the first and second travel motors 28 and 30 may be electric motors. In such an embodiment the control signals from the controller 92 may activate relays and switches to direct electrical power to the electric motors to drive the motors in a desired direction at a desired speed.

The control signals 40C (see FIG. 4) sent to the swing motor 40 selectively drive the swing motor 40 to automatically rotate the main frame 32 about the pivot axis 36 relative to the undercarriage 22 in response to various ones of the input signals. Control signals 28C and 30C (see FIG. 4), which may be referred to as first and second travel motor speed signals, sent to the first and second travel motors 28 and 30 control a direction and speed of the first and second travel motors 28 and 30 to control a rotational movement of the undercarriage 22 relative to the ground surface 38. The control signals are generated at least in part in response to one or more of the input signals.

Controller 92 includes or may be associated with a processor 94, a computer readable medium 96, a data base 98 and an input/output module or control panel 100 having a display 102. An input/output device 104, such as a keyboard, joystick or other user interface, is provided so that the human operator may input instructions to the controller. It is understood that the controller 92 described herein may be a single controller having all of the described functionality, or it may include multiple controllers wherein the described functionality is distributed among the multiple controllers.

Various operations, steps or algorithms as described in connection with the controller 92 can be embodied directly in hardware, in a computer program product 106 such as a software module executed by the processor 94, or in a combination of the two. The computer program product 106 can reside in RAM memory, flash memory, ROM memory, EPROM memory, EEPROM memory, registers, hard disk, a removable disk, or any other form of computer-readable medium 96 known in the art. An exemplary computer-readable medium 96 can be coupled to the processor 94 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

In FIG. 4 the hydraulic fluid supply system is also illustrated, including the previously mentioned hydraulic pump 66 driven by the engine 64. Pump 66 takes hydraulic fluid from a tank 108 and provides pressurized hydraulic fluid to hydraulic fluid supply line 110. Supply line 110 is connected to a first inlet of each of the electro-hydraulic direction and flow rate control valves 28V, 30V and 40V associated first and second travel motors 28 and 30 and the swing motor 40.

Each of the valves 28V, 30V and 40V is shown as a three position valve having a center position where there is no flow through the valve, a left side position wherein fluid flows to a first outlet port, and right side position wherein fluid flows to a second outlet port. The hydraulic fluid from each control valve flows to its respective hydraulic motor in the selected direction. Return fluid from the hydraulic motors flows back through the respective control valve to a return line 112 which returns the hydraulic fluid to tank 108.

Each of the valves 28V, 30V and 40V may be a proportional control valve wherein in addition to controlling the direction of flow, the valve controls the rate of flow of hydraulic fluid, all in response to the control signals received from the controller 92. Alternatively, each of the hydraulic motors may have separate flow direction control valves and flow rate control valves associated therewith.

Modes of Operation

As is further described below with regard to several modes of operation, the controller 92 is configured to receive the pivot angle signal 76S and to selectively drive the swing motor 40 automatically to rotate the main frame 32 about the pivot axis 36 relative to the undercarriage 22 to a target pivot position of the main frame 32 relative to the undercarriage 22.

Figure 5A:
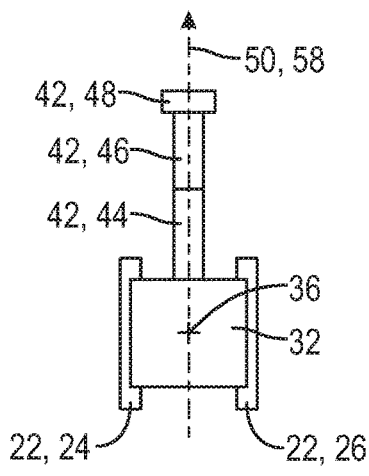
FIG. 5A is a schematic plan view of the machine of FIG. 1 showing a working direction of the boom aligned with a forward traveling direction of the tracks.
Figure 5B:
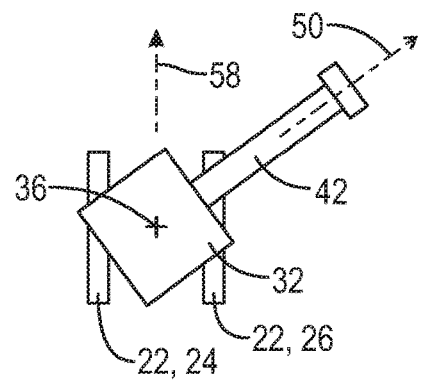
FIG. 5B is a schematic plan view of the machine of FIG. 1 showing the working direction of the boom extending transversely to the forward traveling direction of the tracks.
Figure 5C:
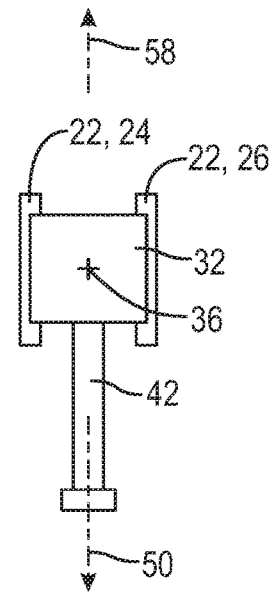
FIG. 5C is a schematic plan view of the machine of FIG. 1 showing the working direction of the boom parallel to but oriented 180 degrees from the forward traveling direction of the tracks.

For reference purposes, several possible orientations of the main frame 32 relative to the undercarriage 22 are shown in FIGS. 5A-5C. FIG. 5A is a schematic plan view of the machine of FIG. 1 showing a working direction of the boom aligned with a forward traveling direction of the tracks. FIG.

5B is a schematic plan view of the machine of FIG. 1 showing the working direction of the boom extending transversely to the forward traveling direction of the tracks. FIG. 5C is a schematic plan view of the machine of FIG. 1 showing the working direction of the boom parallel to but oriented 180 degrees from the forward traveling direction of the tracks.

Figure 6A:
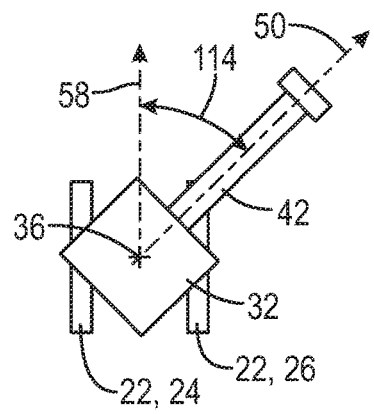
FIGS. 6A-6C comprise a schematic sequential series of plan views of the machine of FIG. 1 illustrating an automatic track alignment mode providing a change in orientation of the undercarriage relative to the ground surface through a first angle, and a simultaneous rotation of the main frame relative to the undercarriage through a second angle opposite and equal to the first angle, so that the undercarriage is moved into alignment with the boom without changing the orientation of the boom relative to the ground surface.
Figure 6B:
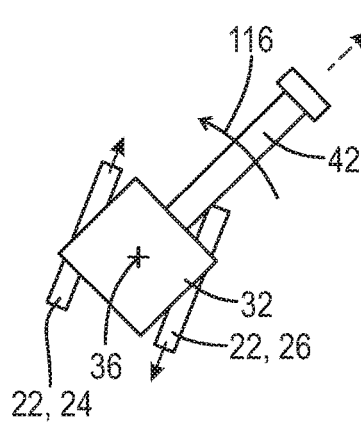
Figure 6C:
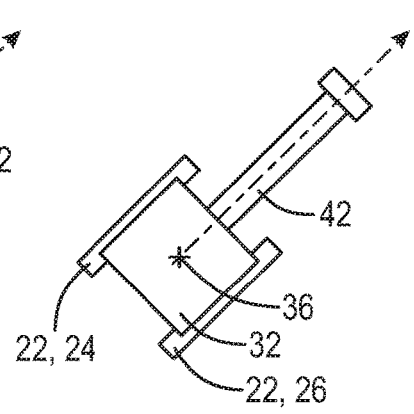

Automatic Track Alignment Mode of FIGS. 6A-6C

The controller 92 includes an automatic track alignment mode which will rotate the undercarriage 22 in place under the main frame 32, to a position wherein the working direction 50 of the boom assembly 42 or boom 44 is aligned with the forward traveling direction 58 of the working machine 20, without changing the orientation of the boom assembly 42 relative to the ground surface 38. In the automatic track alignment mode the target pivot position of the main frame 32 relative to the undercarriage 22 is a pivot position wherein the forward traveling direction 58 of the ground engaging units 24 and 26 is aligned with the working direction 50 of the boom assembly 42. This automatic track alignment mode is schematically illustrated in the series of FIGS. 6A-6C.

In FIG. 6A the working machine 20 is shown in an initial position wherein forward traveling direction 58 of the ground engaging units 24 and 26 and the working direction 50 of the boom assembly 42 are angularly offset from each other by a first angle 114. It is desired to reorient the undercarriage 22 relative to the ground surface to the position of FIG. 6C without changing the orientation of the boom assembly 42 relative to the ground surface.

The human operator of the working machine 20 may select the automatic track alignment mode by an appropriate input to the input device 104. When the automatic track alignment mode is selected the controller 92 is configured to automatically drive both travel motors 24 and 26 to change the orientation of the undercarriage 22 relative to the ground surface 38 from the initial orientation of FIG. 6A to the final orientation of FIG. 6C by simultaneously operating the motors 24 and 26 in opposite directions at substantially equal rotational speeds and thereby rotating the undercarriage 22 through the first angle 114 relative to the ground surface 38. The controller 92 may generate the control signals 24C and 26C to the travel motors 24 and 26 at least in part in response to the first and second travel motor speed signals 78S and 80S to ensure that the travel motors are operating at substantially equal speeds.

In the automatic track alignment mode the controller 92 is also configured to automatically drive the swing motor 40 to rotate the main frame 32 about the pivot axis 36 from the initial pivot position relative to the undercarriage shown in FIG. 6A through a second angle 116 opposite and equal to the first angle 114 to the final position of FIG. 6C, simultaneously with and at substantially the same rate as the undercarriage 22 is rotated relative to the ground surface 38, so that an orientation of the main frame 32 relative to the ground surface 38 is maintained while the orientation of the undercarriage 22 relative to the ground surface 38 is changed. In the automatic track alignment mode the target pivot position of the main frame 32 relative to the undercarriage 22 is a position displaced by the second angle from the initial pivot position of the main frame 32 relative to the undercarriage 22.

FIG. 6B schematically illustrates an intermediate position between the initial position of FIG. 6A and the final position of FIG. 6C, in which intermediate position the tracks 24 and 26 are driving in opposite directions at equal speeds to rotate the undercarriage 22 clockwise, while simultaneously the swing motor 40 is driven to rotate the main frame 32 counterclockwise relative to the undercarriage 22.

The controller 92 will also receive the input signal 76S from the pivot angle sensor 76 and will direct the simultaneous rotation of the undercarriage 22 relative to the ground surface 38 and counterrotation of the main frame 32 relative to the undercarriage 22 until the working direction 50 of the boom assembly 42 is aligned with the forward traveling direction 58 of the undercarriage 22. The controller 92 may be further configured to decelerate the rotation and counterrotation gradually as the target pivot position of the main frame 32 relative to the undercarriage 22 is approached.

Figure 7A:
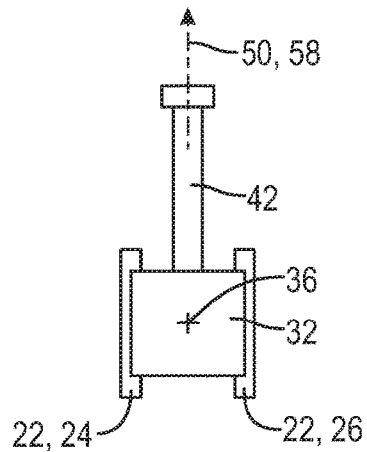
FIGS. 7A-7C comprise a schematic sequential series of plan views of the machine of FIG. 1 illustrating an undercarriage swing mode allowing the human operator to control the rotating of the undercarriage relative to the ground surface to any orientation selected by the human operator, while maintaining an initial orientation of the boom assembly relative to the ground surface.
Figure 7B:
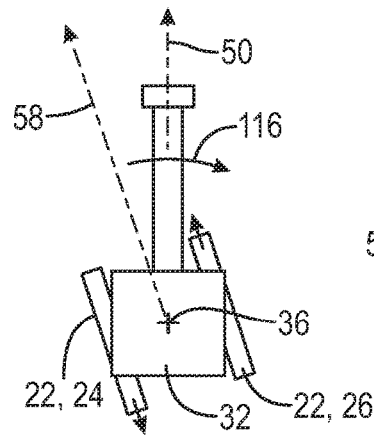
Figure 7C:
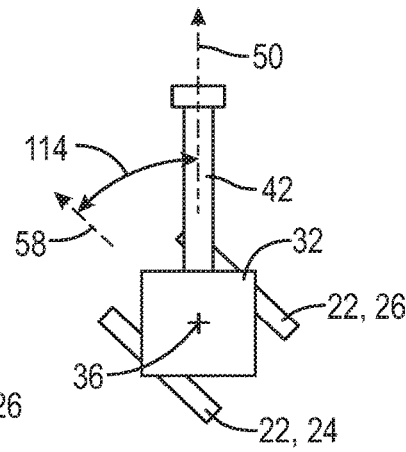

Undercarriage Swing Mode of FIGS. 7A-7C

The controller 92 includes an undercarriage swing mode wherein the human operator can control the rotating of the undercarriage 22 relative to the ground surface 38 to any orientation selected by the human operator, while maintaining an initial orientation of the boom assembly 42 relative to the ground surface 38. For example the working machine 20 may start in an initial position as shown in FIG. 7A wherein the working direction 50 of the boom assembly 42 is aligned with the forward traveling direction 58 of the working machine 20. The human operator may desire to rotate the undercarriage 22 counterclockwise relative to the ground surface 38 to the final position of FIG. 7C, while maintaining the initial orientation of the boom assembly 42 relative to the ground surface 38. This undercarriage swing mode is schematically illustrated in the series of FIGS. 7A-7C.

The human operator of the working machine 20 may select the undercarriage swing mode by an appropriate input to the input device 104. When the undercarriage swing mode is selected the controller 92 is configured to automatically drive both travel motors 24 and 26 under a further control input from the human operator to change the orientation of the undercarriage 22 relative to the ground surface 38 from the initial orientation of FIG. 7A in a selected clockwise or counterclockwise direction by simultaneously operating the motors 24 and 26 in opposite directions at substantially equal rotational speeds. This will rotate the undercarriage 22 through a first angle 114 relative to the ground surface 38 until the rotating command is terminated by control input from the human operator. As the undercarriage 22 is rotating counterclockwise as directed by the human operator, the controller 92 automatically drives the swing motor 40 to rotate the main frame 32 about the pivot axis 36 clockwise relative to the undercarriage 22, simultaneously with and at substantially the same rate as the undercarriage 22 is rotated relative to the ground surface 38. Thus the orientation of the main frame 32 relative to the ground surface 38 is maintained while the orientation of the undercarriage 22 relative to the ground surface 38 is changed. In the undercarriage swing mode the target pivot position of the main frame 32 relative to the undercarriage 22 is a position displaced by from an initial pivot position of the main frame 32 relative to the undercarriage 22 by an angle equal to and opposite from the first angle by which the human operator chooses to rotate the undercarriage 22 relative to the ground surface 38.

FIG. 7B schematically illustrates an intermediate position between the initial position of FIG. 7A and the final position of FIG. 7C, in which intermediate position the tracks 24 and 26 are driving in opposite directions at equal speeds to rotate the undercarriage 22 counterclockwise, while simultaneously the swing motor 40 is driven to rotate the main frame 32 clockwise relative to the undercarriage 22.

Figure 8A:
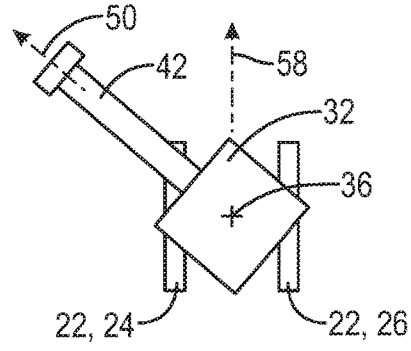
FIGS. 8A-8C comprise a schematic sequential series of plan views of the machine of FIG. 1 illustrating an automatic boom alignment mode in which the boom assembly is automatically rotated relative to the undercarriage to a position wherein the working direction of the boom assembly is parallel to the forward travel direction, without making any change in orientation of the undercarriage relative to the ground surface.
Figure 8B:
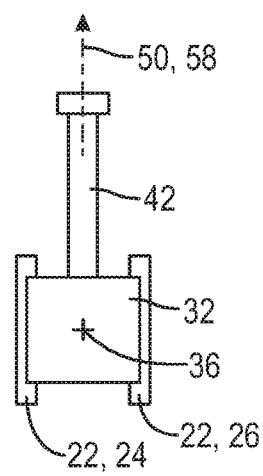
Figure 8C:
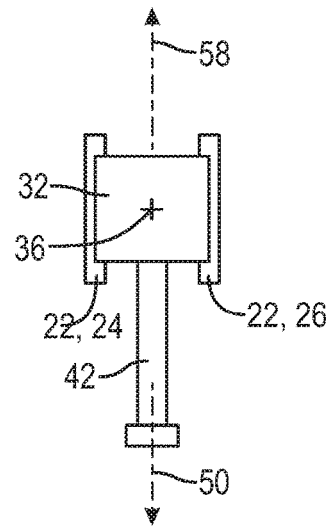

Automatic Boom Alignment Mode of FIGS. 8A-8C

The controller 92 also includes an automatic boom alignment mode. In the automatic boom alignment mode the human operator may wish to rotate the boom assembly 42 relative to the undercarriage 22 to a position wherein the working direction 50 of the boom assembly 42 is parallel to the forward travel direction 50, without making any change in orientation of the undercarriage 22 relative to the ground surface 38. The boom assembly 42 may have its working direction 50 aligned with the forward traveling direction 58 as seen in FIG. 8B, or parallel to but oriented 180 degrees from the forward traveling direction 58 of the tracks as seen in FIG. 8C. Such boom alignment may for example be desired prior to moving the working machine from one working location to another. This automatic boom alignment mode is schematically illustrated in FIGS. 8A-8C.

The human operator of the working machine 20 may select the boom alignment mode by an appropriate input to the input device 104. When the boom alignment mode is selected the controller 92 is configured to automatically drive the swing motor 40 at least in part in response to the input signal 76S from the pivot angle sensor 76, to either of the positions of FIG. 8B or 8C. The boom alignment mode may include optional inputs allowing the human operator to choose either of the final positions of FIG. 8B or 8C, or the boom alignment mode may be programmed to automatically select the closest one of the positions of FIG. 8B or 8C.

The controller 92 may be further configured to decelerate the rotation and counterrotation gradually as the target pivot position of the main frame 32 relative to the undercarriage 22 is approached.

Figure 9A:
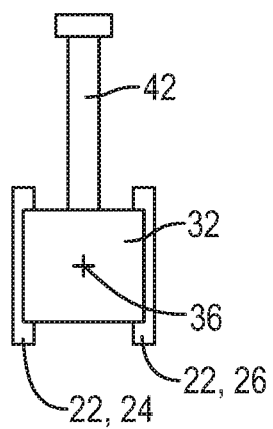
FIGS. 9A-9C comprise a plurality of alternative plan views of the machine of FIG. 1 illustrating a multiple preset position mode allowing the human operator to preset a plurality of preset target pivot positions of the main frame relative to the undercarriage, and then to select any one of the preset target pivot positions of the main frame relative to the undercarriage.
Figure 9B:
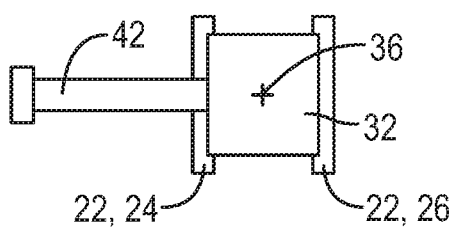
Figure 9C:
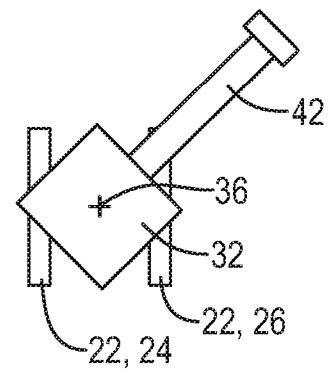

Multiple Preset Position Mode of FIGS. 9A-9C

The controller 92 also includes a multiple preset position mode. In the multiple preset position mode the human operator can preset a plurality of preset target pivot positions of the main frame 32 relative to the undercarriage 22, and then the human operator can select any one of the preset target pivot positions of the main frame 32 relative to the undercarriage 22. For example, the operator of the excavator 20 may be excavating earth at a first orientation of the boom assembly 42 relative to the ground surface 38 as shown in FIG. 9A, depositing excavated earth to the left side on a pile with the boom assembly in a second orientation relative to the ground surface as shown in FIG. 9B, and periodically loading excavated earth to a truck located to the right side with the boom assembly 42 in a third orientation relative to the ground surface as shown in FIG. 9C.

The human operator of the working machine 20 may select the multiple preset position mode by an appropriate input to the input device 104. When the multiple preset position mode is selected the human operator can place the boom assembly 42 in selected positions relative to the undercarriage 22 and "save" those positions 9A, 9B and 9C as the plurality of preset positions. Then with further inputs to the controller 92 the operator may select any one of the preset positions and the controller 92 will be configured to automatically pivot the boom assembly 42 from wherever it is to that preset position. When one of the preset positions is selected the controller 92 is configured to automatically drive the swing motor 40 at least in part in response to the input signal 76S from the pivot angle sensor 76, to pivot the boom assembly 42 to the selected preset position. The controller 92 may be further configured to decelerate the rotation and counterrotation gradually as the target pivot position of the main frame 32 relative to the undercarriage 22 is approached.

Orientation Sensing

Each of the above modes of operation may be performed with or without input from one of the orientation sensors 82.

The use of one of the orientation sensors 82 can provide an additional input to the controller 92 to further ensure that an orientation of the boom assembly 42 relative to the ground surface 38 does not change while the undercarriage 22 is reoriented relative to the ground surface. When using one of the orientation sensors 82, the controller receives an orientation signal 82S corresponding to an orientation or a change in orientation of the orientation sensor relative to the ground surface 38, and the controller 92 is configured to maintain the orientation of the main frame 32 relative to the ground surface at least in part based upon the orientation signal 82S.

Also the use of the orientation sensors 82 can ensure that a desired reorientation of the undercarriage 22 relative to the ground surface 38 is achieved, regardless of slippage of one or both of the tracked ground engaging units relative to the ground surface 38 during the reorientation of the undercarriage 22.

When using the orientation sensor 82 embodied as the inertial measurement unit (IMU) 84 mounted on the main frame 32 or the cab 60, the IMU detects changes in orientation of the orientation sensor 82, and thus of the main frame 32 to which it is fixed, relative to an initial orientation.

When using the orientation sensor 82 embodied as a plurality of GPS sensing units 86, 88 fixed relative to the main frame 32 and the cab 60 the GPS sensing units can detect the absolute position and orientation of the working machine 20 within an external reference system, and can detect changes in such position and orientation.

Figure 3:
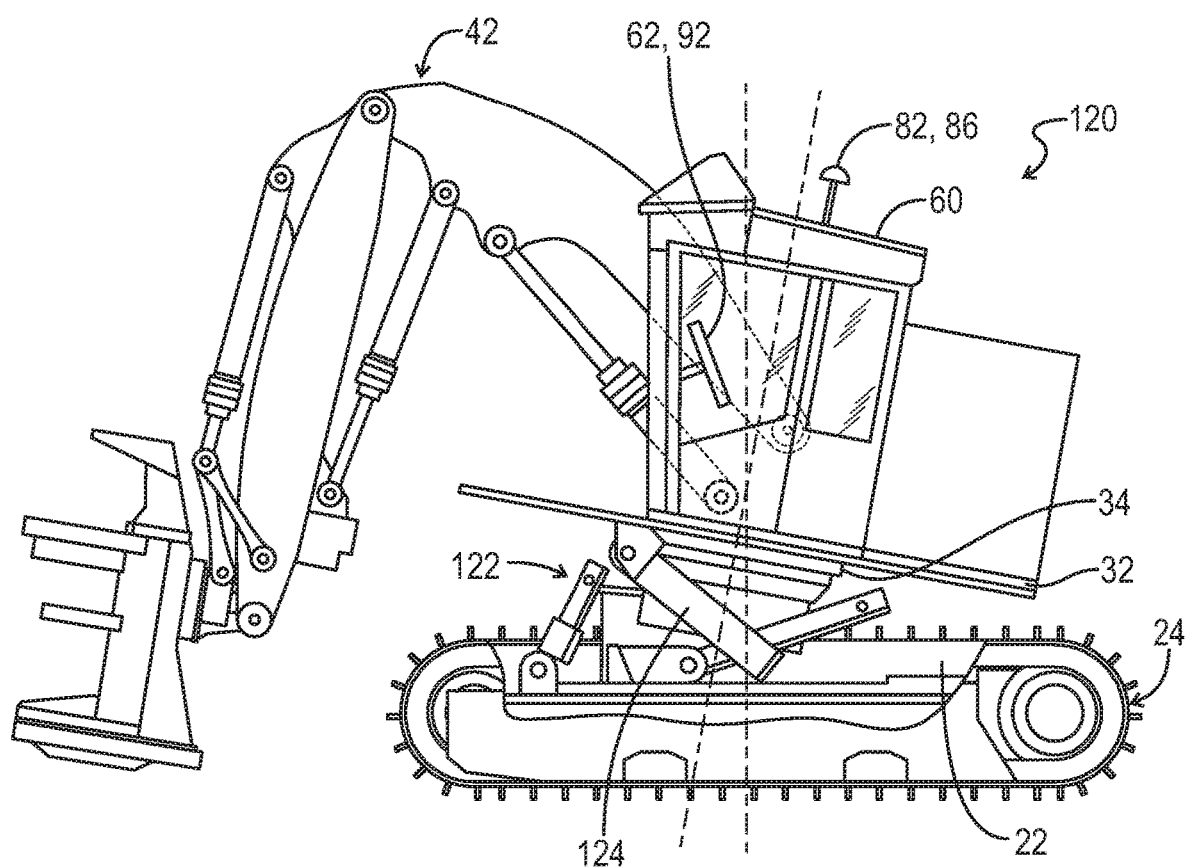
FIG. 3 is a side elevation view of a tracked feller buncher machine incorporating the automatic control systems disclosed herein and including a leveling mechanism for controlling pitch and roll of the swing bearing.

Alternative Embodiment of FIG. 3

The control system 90 disclosed herein may be used in connection many different working machines of the type having a boom assembly pivotal about a generally vertical pivot axis relative to an undercarriage of the working machine.

FIG. 3 illustrates another embodiment of such a working machine embodied as a tracked feller buncher machine 120 for use in forestry for the harvesting of trees. Similar to the excavator type of working machine 20 previously described, the tracked feller buncher machine 120 has an undercarriage 22, first and second tracked ground engaging units 24 and 26, main frame 32, swing bearing 34, and boom assembly 42. The feller buncher machine 120 may include the same control system 90 just described with regard to FIG. 4 to control the orientation of its undercarriage 22 relative to the ground surface 38, and to control the orientation of its main frame 32 and boom assembly 42 relative to its undercarriage 22.

However the feller buncher machine 120, as contrasted to the excavator machine 20, is often operated on very uneven ground such as when harvesting trees in a mountainous area. Accordingly the feller buncher machine 120 may include a leveling mechanism 122 including a plurality of linear actuators which may be in the form of hydraulic piston-cylinder units 124 and 126 to adjust a pitch and roll of the swing bearing 34 and thus the main frame 32 relative to the undercarriage 22. The leveling mechanism 122 may be constructed in accordance with the teachings of U.S. Pat. No. 8,180,532, the details of which are incorporated herein by reference. In the case of the feller buncher machine 120 the pivotal axis 36 is defined by the swing bearing 34 and the pivot angle sensor 76 is mounted between the upper and lower rings 68 and 70 of the swing bearing 34.

The purpose of the leveling mechanism 122 is to maintain the operator's cab 60 in a generally horizontal orientation relative to gravity for the comfort and safety of the human operator who is operating the feller buncher machine 120.

It will be appreciated that for a given non-horizontal ground surface 138, the necessary positions of the hydraulic piston-cylinder units 124 and 126 to maintain the operator's cab 60 in a generally horizontal orientation will vary depending on the pivotal position of the main frame 32 about the pivot axis 36 which is defined by the swing bearing 34.

When incorporating the control system 90 in a feller buncher machine 120 including such a leveling mechanism 122, the controller 92 includes a level control mode in which the controller 92 is configured to control the extension of the various hydraulic piston-cylinder units 124 and 126 of the leveling mechanism 122, to control the pitch and roll of the swing bearing 34 at least in part based upon the pivot angle signal 76S from the pivot angle sensor 76.

As is further shown in FIG. 4, in the level control mode the controller 92 is configured to send control signals 124C and 126C to electro-hydraulic proportional control valves 124V and 126V to control the direction and rate of flow of hydraulic fluid to the hydraulic piston-cylinder units 124 and 126. The control signals 124C and 126C are at least in part based upon the pivot angle signal 76S from the pivot angle sensor 76.

Alternatively, the linear actuators 124 may be other types of linear actuators, including hydraulically or electrically powered lead screws, electrically or hydraulically powered rack and pinion, pneumatic actuators, or the like.

Methods of Operation

One method of operation of the working machine 20 or 120 may include steps of:
(a) automatically sensing a pivot position of the main frame 32 relative to the undercarriage 22 about the pivot axis 36; and
(b) automatically controlling the swing motor 40 and thereby rotating the main frame 32 about the pivot axis 36 relative to the undercarriage 22 to a target pivot position of the main frame 32 relative to the undercarriage 22.

The method may further include:
starting with the undercarriage 22 in an initial orientation relative to the ground surface 38 and with the main frame 32 in an initial pivot position relative to the undercarriage 22, automatically driving both travel motors 24 and 26 to change the orientation of the undercarriage 22 relative to the ground surface 38 by rotating the undercarriage 22 through a first angle 114 relative to the ground surface 38; and
wherein step (b) further includes automatically driving the swing motor 40 to rotate the main frame 32 about the pivot axis 36 through a second angle 116 opposite and equal to the first angle 114, simultaneously with and at substantially the same rate as the undercarriage 22 is rotated relative to the ground surface 38, thereby maintaining an orientation of the main frame 32 relative to the ground surface 38 while changing the orientation of the undercarriage 22 relative to the ground surface 38.

The method may further include automatically terminating the rotating of the undercarriage 22 relative to the ground surface 38 when the forward traveling direction 58 of the ground engaging units 24, 26 is aligned with the working direction 50 of the boom assembly 42.

The method may further include terminating the rotating of the undercarriage 22 relative to the ground surface 38 by a control input from a human operator of the working machine 20, 120.

The method may further include:
generating an orientation signal 82S representative of an orientation or a change in orientation of the main frame 32 relative to the ground surface 38; and
wherein step (b) further includes maintaining the orientation of the main frame 32 relative to the ground surface 38 at least in part based upon the orientation signal 82S.

The method may further include a step of automatically controlling the pitch and roll of the swing bearing 34 at least in part based upon the pivot position of the main frame 32 relative to the undercarriage 22 about the pivot axis 36.

The method may further include in step (b) in the target pivot position the working direction 50 of the boom 44 being parallel to the forward traveling direction 50.

The method may further include:
presetting a plurality of preset target pivot positions of the main frame 32 relative to the undercarriage 22; and
prior to step (b), selecting one of the preset target positions of the main frame 32 relative to the undercarriage 22.

Thus it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims Each disclosed feature or embodiment may be combined with any of the other disclosed features or embodiments.

What is claimed is:

1. A working machine, comprising:
an undercarriage including first and second ground engaging units including first and second travel motors for driving the first and second ground engaging units, respectively;
a main frame;
a swing bearing supporting the main frame from the undercarriage such that the main frame is pivotable about a pivot axis relative to the undercarriage, the pivot axis being substantially vertical when a ground surface engaged by the ground engaging units is substantially horizontal;
a swing motor configured to pivot the main frame on the swing bearing about the pivot axis relative to the undercarriage;
a boom extending from the main frame along a working direction of the boom;
a pivot angle sensor configured to provide a pivot angle signal corresponding to a pivot position of the main frame relative to the undercarriage about the pivot axis; and
a controller configured to receive the pivot angle signal, the controller being configured to selectively drive the swing motor automatically to rotate the main frame about the pivot axis relative to the undercarriage to a target pivot position of the main frame relative to the undercarriage.

2. The working machine of claim 1, wherein the controller is configured to:
automatically drive both travel motors to change an orientation of the undercarriage relative to the ground surface from an initial orientation by rotating the undercarriage through a first angle relative to the ground surface; and automatically drive the swing motor to rotate the main frame about the pivot axis from an initial pivot position relative to the undercarriage through a second angle opposite and equal to the first angle, simultaneously with and at substantially the same rate as the undercarriage is rotated relative to the ground surface, so that an orientation of the main frame relative to the ground surface is maintained while the orientation of the undercarriage relative to the ground surface is changed, wherein the target pivot position of the main frame relative to the undercarriage is a position displaced by the second angle from the initial pivot position of the main frame relative to the undercarriage.

3. The working machine of claim 2, wherein:
the first and second ground engaging units are tracked ground engaging units, each of the tracked ground engaging units including a front idler, a drive sprocket, a track chain extending around the front idler and the drive sprocket, and wherein the respective travel motor drives the drive sprocket, each tracked ground engaging unit having a forward traveling direction defined from the drive sprocket toward the front idler; and
the controller includes an automatic track alignment mode wherein the target pivot position of the main frame relative to the undercarriage is a pivot position wherein the forward traveling direction of the ground engaging units is aligned with the working direction of the boom and wherein the rotating of the undercarriage relative to the ground surface is automatically terminated when the forward traveling direction of the ground engaging units is aligned with the working direction of the boom.

4. The working machine of claim 2, wherein:
the controller includes an undercarriage swing mode wherein the rotating of the undercarriage relative to the ground surface continues until terminated by a control input from a human operator of the working machine.

5. The working machine of claim 2, further comprising:
an orientation sensor mounted on the working machine and configured to provide an orientation signal corresponding to an orientation or a change in orientation of the orientation sensor relative to the ground surface; and
wherein the controller is configured to receive the orientation signal and to maintain the orientation of the main frame relative to the ground surface at least in part based upon the orientation signal.

6. The working machine of claim 2, further comprising:
a leveling mechanism mounted to the undercarriage and supporting the swing bearing, the leveling mechanism including a plurality of hydraulic cylinders configured to adjust a pitch and roll of the swing bearing relative to the undercarriage; and
the controller being configured to direct control of the pitch and roll of the swing bearing at least in part based upon the pivot angle signal.

7. The working machine of claim 1, wherein:
the ground engaging units define a forward traveling direction of the undercarriage; and
the controller includes an automatic boom alignment mode wherein in the target pivot position the working direction of the boom is parallel to the forward traveling direction.

8. The working machine of claim 1, further comprising:
a controller interface configured such that a human operator of the working machine can preset a plurality of preset target pivot positions of the main frame relative to the undercarriage, and such that the human operator can select any one of the preset target pivot positions of the main frame relative to the undercarriage.

9. The working machine of claim 1, wherein:
the first and second ground engaging units are tracked ground engaging units, each of the tracked ground engaging units including a front idler, a drive sprocket, a track chain extending around the front idler and the drive sprocket, and wherein the respective travel motor drives the drive sprocket, each tracked ground engaging unit having a forward traveling direction defined from the drive sprocket toward the front idler; and
the controller is configured to automatically drive both travel motors at the same rate in opposite directions to change an orientation of the undercarriage relative to the ground surface by rotating the undercarriage through a first angle relative to the ground surface.

10. The working machine of claim 9, further comprising:
first and second travel motor speed sensors configured to provide first and second travel motor speed signals, respectively, corresponding to rotational speeds of the first and second travel motors; and
wherein the controller is configured to receive the first and second travel motor speed signals.

11. The working machine of claim 1, wherein:
the first and second travel motors and the swing motor are each hydraulic motors;
the working machine further includes an electro-hydraulic direction and flow rate control valve associated with each of the hydraulic motors; and
the controller is configured to generate control signals directed to each of the electro-hydraulic direction and flow rate control valves to control the direction of hydraulic fluid through the respective hydraulic motor and the flow rate of hydraulic fluid to the respective hydraulic motor.

12. The working machine of claim 1, wherein the working machine is a machine selected from the group consisting of:
a tracked excavator machine;
a wheeled excavator machine;
a tracked feller buncher machine;
a tracked front shovel machine; and
a wheeled front shovel machine.

13. A method of controlling a working machine, the working machine including:
an undercarriage including first and second ground engaging units including first and second travel motors for driving the first and second ground engaging units, respectively;
a main frame;
a swing bearing supporting the main frame from the undercarriage such that the main frame is pivotable about a pivot axis relative to the undercarriage, the pivot axis being substantially vertical when a ground surface engaged by the ground engaging units is substantially horizontal;
a swing motor configured to pivot the main frame on the swing bearing about the pivot axis relative to the undercarriage; and
a boom extending from the main frame along a working direction of the boom;
the method comprising steps of:
(a) automatically sensing a pivot position of the main frame relative to the undercarriage about the pivot axis; and
(b) automatically controlling the swing motor and thereby rotating the main frame about the pivot axis relative to the undercarriage to a target pivot position of the main frame relative to the undercarriage.

14. The method of claim 13, further comprising:
starting with the undercarriage in an initial orientation relative to the ground surface and with the main frame in an initial pivot position relative to the undercarriage, automatically driving both travel motors to change the orientation of the undercarriage relative to the ground surface by rotating the undercarriage through a first angle relative to the ground surface; and
wherein step (b) further includes automatically driving the swing motor to rotate the main frame about the pivot axis through a second angle opposite and equal to the first angle, simultaneously with and at substantially the same rate as the undercarriage is rotated relative to the ground surface, thereby maintaining an orientation of the main frame relative to the ground surface while changing the orientation of the undercarriage relative to the ground surface.

15. The method of claim 14, wherein:
the first and second ground engaging units are tracked ground engaging units, each of the tracked ground engaging units including a front idler, a drive sprocket, a track chain extending around the front idler and the drive sprocket, and wherein the respective travel motor drives the drive sprocket, each tracked ground engaging unit having a forward traveling direction defined from the drive sprocket toward the front idler; and
the rotating of the undercarriage relative to the ground surface is automatically terminated when the forward traveling direction of the ground engaging units is aligned with the working direction of the boom assembly.

16. The method of claim 14, further comprising:
terminating the rotating of the undercarriage relative to the ground surface by a control input from a human operator of the working machine.

17. The method of claim 14, further comprising:
generating an orientation signal representative of an orientation or a change in orientation of the main frame relative to the ground surface; and
wherein step (b) further includes maintaining the orientation of the main frame relative to the ground surface at least in part based upon the orientation signal.

18. The method of claim 14, wherein:
the working machine includes a leveling mechanism mounted to the undercarriage and supporting the swing bearing, the leveling mechanism including a plurality of hydraulic cylinders configured to adjust a pitch and roll of the swing bearing relative to the undercarriage; and
further comprising a step of automatically controlling the pitch and roll of the swing bearing at least in part based upon the pivot position of the main frame relative to the undercarriage about the pivot axis.

19. The method of claim 13, wherein:
the ground engaging units define a forward traveling direction of the undercarriage; and
in step (b) in the target pivot position the working direction of the boom is parallel to the forward traveling direction.

20. The method of claim 13, further comprising:
presetting a plurality of preset target pivot positions of the main frame relative to the undercarriage; and
prior to step (b), selecting one of the preset target positions of the main frame relative to the undercarriage.

* * * * *